United States Patent [19]

Ganter-Ullmann et al.

[11] 4,015,485
[45] Apr. 5, 1977

[54] CRANK SHAFT FOR A MULTI-CYLINDER SHORT STROKE INTERNAL COMBUSTION ENGINE

[75] Inventors: Karl Ganter-Ullmann, Cologne; Paul Neussel, Langenfeld; Hubert Abermeth; Jürgen Wahnschaffe, both of Cologne; Heiner Klier, Bensberg-Refrath, all of Germany

[73] Assignee: Klockner-Humboldt-Deutz Aktiengesellschaft, Cologne, Germany

[22] Filed: July 24, 1975

[21] Appl. No.: 598,565

[30] Foreign Application Priority Data

July 24, 1974 Germany .......................... 2435476

[52] U.S. Cl. .................................. 74/596; 74/605
[51] Int. Cl.² .................... F16C 3/04; F16F 3/14
[58] Field of Search ............ 74/595, 596, 597, 605

[56] References Cited

UNITED STATES PATENTS

| | | | |
|---|---|---|---|
| 2,109,526 | 3/1938 | Fell | 74/597 |
| 2,365,394 | 12/1944 | Criswell | 74/595 |
| 2,440,812 | 5/1948 | Simpson | 74/605 |

FOREIGN PATENTS OR APPLICATIONS 46-14176  5/1971  Japan ................................. 74/605

*Primary Examiner*—Samuel Scott
*Assistant Examiner*—F. D. Shoemaker
*Attorney, Agent, or Firm*—Walter Becker

[57] ABSTRACT

A crank shaft for a multi-cylinder, short stroke internal combustion engine in which the diameters of the crank pin and of the shaft journal overlap each other, and in which the crank web decreases in thickness approximately from the center of the crank pin with increasing distance from the shaft center. In the crank webs within the region of the crank pin, relief bores are provided the axes of which are inclined with regard to the axis of said shaft journals. The relief bores are designed as blind bores with a flat bottom surface and with a circumferential surface merging with the flat bottom surface along a rounded surface section. The merging portion nearest to the area of the respective pertaining shaft journal is located approximately in the plane perpendicular to the longitudinal axis of the crank shaft and approximately in the middle between the crank pin and the shaft journal. With a diameter ratio of the crank pin to the shaft journal of about 0.8, the diameter of the relief bore corresponds to from 0.35 to 0.55 times the diameter of the shaft journal but at a maximum is so great that the overlapping of the respective relief bore with the outer contour of the respective adjacent web is spaced from the shaft axis by a minimum distance of 0.6 times the diameter of the shaft journal and that the respective relief bore is at a minimum spaced from the rounded merging surface section of the crank pin with the respective adjacent web by a distance of approximately 12mm.

4 Claims, 1 Drawing Figure

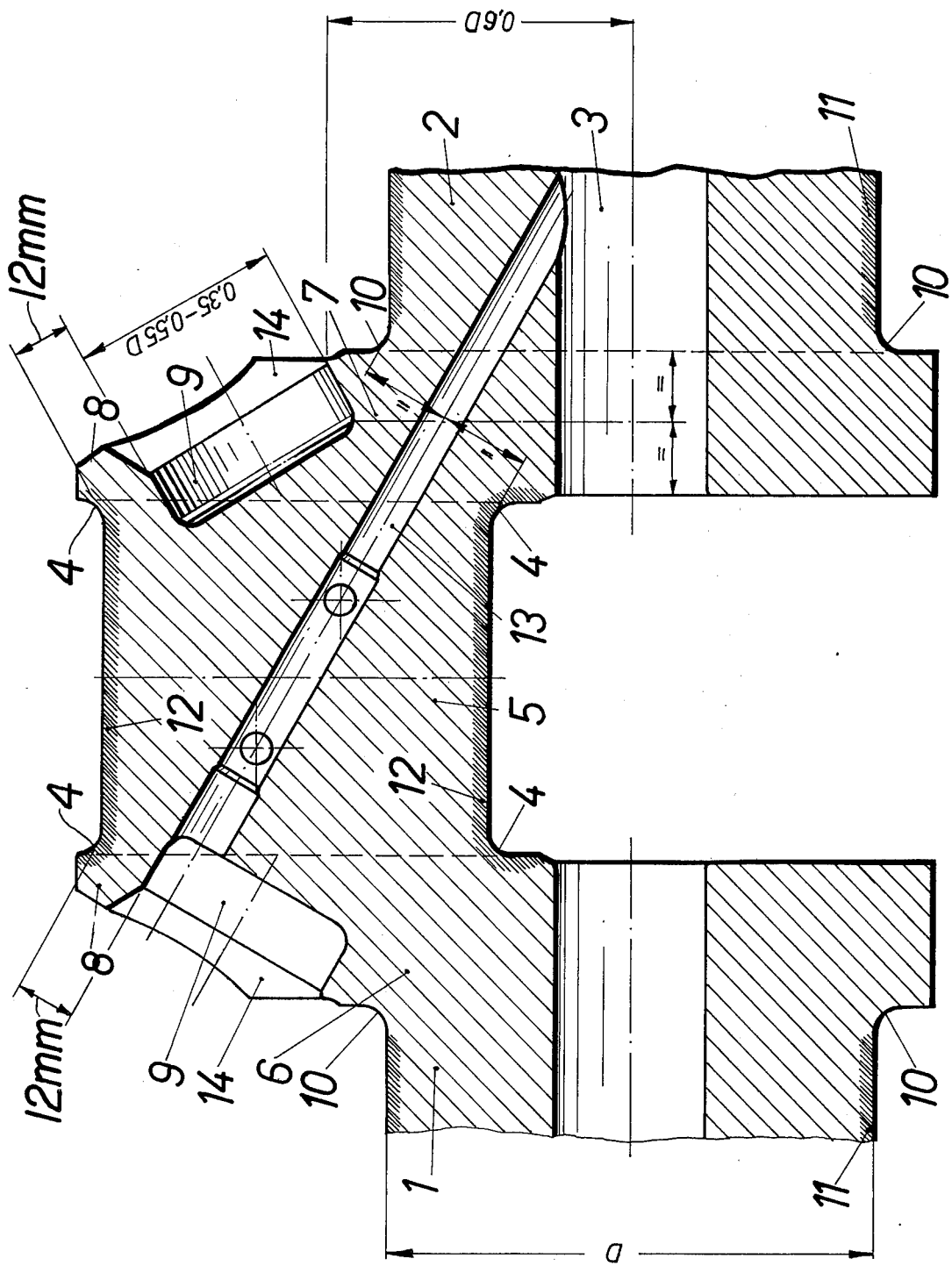

CRANK SHAFT FOR A MULTI-CYLINDER SHORT STROKE INTERNAL COMBUSTION ENGINE

The present invention relates to a crankshaft for a multicylinder short stroke internal combustion engine in which the stroke diameter and the crankpin diameter overlap, and in which the crankweb decreases in thickness approximately from the center of the crankpin with increasing distance from the center of the crankshaft, and in which the crankweb is within the region of the crankpins provided with relief bores which are inclined toward the bearing pivot axis.

With the further development of proven internal combustion engines which are produced in mass fabrication, for purposes of increasing the output, as a rule an increase in the medium pressure or an increase in the stroke volume is obtained by increasing the diameter of the cylinder. This step usually does not require important changes in the expensive manufacturing devices which are combined to form transfer paths. The frequently effected increase in the diameter of the cylinder simultaneously requires a change in the stroke-bore relationship with regard to short stroke engines and results in very compact designs.

With the increase in the medium pressure or the increase in the cylinder diameter, however, the crankshaft is subjected to considerably higher stresses so that its strength limit will be insufficient. The already determined dimensions such as cylinder spacing and stroke length do not permit any major changes in the crankshaft so that changes in form remain limited to certain areas. The above mentioned steps for increasing the output frequently also require an increase in the bearing surfaces which, however, due to the narrow cylinder space is realized only by increasing the bearing diameter so that the diameter of the shaft bearings and stroke bearings overlap more and more while the crankwebs are relatively thinner. While this brings about a very form-resistant crankshaft, the latter is characterized by considerable changes in cross section. Where such cross sections have been effected, high stress peaks occur. If the stress concentration at these areas exceeds the strength of the respective structural element, a tear occurs which in time results in a permanent break.

For purposes of reducing the danger of breakage, the transition areas of the bearings in the crankwebs could be provided with greater radii which, however, requires a non-admissible decrease in the bearing surface. A further step to reduce the danger of breakage consists in the hardening of the bearing surfaces and the transition areas thereof. Such steps, however, have the drawback that the crankshaft can thereafter not any longer be aligned properly. The aligned shaft will, according to experience, when running under load spring back into the original non-aligned condition.

With breaks in the crankshaft, it has been found that the region of the crankweb between the crankpins and the shaft journal is almost always the weakest spot. Within this region, high stress concentrations occur at the surface which stress concentrations frequently exceed the fatigue limit and lead to breakage.

It is known to drill the crankpin for purposes of reducing the rotating masses. Such a step changes the distribution of the stresses. The stress peaks are displaced from the center of the crank plane to the sides. Favorable stress distributions in the endangered cross section result from a parallel-shaped hollow bore in the crankpin. Such bore, however, is economically feasible only with cast crankshafts. Mechanically produced hollow bores with multicylinder crankshafts, especially for V-engines, will due to the impeded location of the individual webs permit only short drilling diameters with an eccentric position in the crankpin. The eccentric position and the short diameter of such bores result in unfavorable stress conditions (maximum stress: rated stress) and thereby yield unfavorable form quotients or stress concentration factors.

It is, therefore, an object of the present invention so to design a crankshaft that the occurring maximum stresses resulting from bending and torsion will be as low as possible relative to the calculated rated stresses which means will have low form quotients while the product of rated stresses times form quotients equals the maximum stress.

This object and other objects and advantages of the invention will appear more clearly from the following specification, in connection with the accompanying drawing diagrammatically illustrating an embodiment according to the present invention.

A crankshaft according to the present invention is characterized primarily in that the relief bores are designed as blind bores with a round transition of the circumferential surface to the flat bottom surface, while the transition at that area which is closest to the shaft bearing pin is located approximately in the middle between the crankpin and the shaft journal and with a diameter ratio of crankpin and shaft journal of approximately 0.8, the diameter of the relief bore corresponds to 0.5 times the diameter of the shaft journal. The diameter of the relief bore is, however, at a maximum so great that the intersection of the relief bore with the outer contour of the web is spaced from the shaft axis by a distance equaling at least 0.6 times the diameter of the shaft journal while the relief bore is spaced from the transition radius of the crankpin to the web by at least 12 mm.

Due to such relief bores which as to their location, shape and size, are designed in conformity with the crankshaft of a modern short stroke engine, it will be appreciated that together with a wide elliptical web shape, there is obtained a very favorable distribution of the stresses which distribution avoids high stress peaks. At the same time, these bores also contribute to the desired reduction in weight of the crankpin.

A further favorable stress distribution and thus a higher fatigue limit of the structural elements will be realized by the fact that with the shaft journal the hardened zone extends exclusively over the cylindrical region, whereas with the crankpin it extends over the cylindrical region and its transition area up to the web. In this way, the crankshaft will be indirectly reinforced particularly at the highly stressed channel or fillet of the crankpin so that the crankshaft will be adapted to the shaft journal which anyhow is stronger. This likewise brings about a more favorable stress distribution. A further advantage of the shaft journal which is not hardened at the transition areas is due to the possibility of a post-aligning of the crankshaft. With completely hardened shaft journal and crankpin, the aligning of the shaft after the hardening is rather difficult. This is due to the fact that in accordance with experience, such crankshaft, if it was aligned, will when being subjected to stresses again spring back to the original shape. In this connection, there exists the danger that microtears form in the fillets or said overstresses occur.

According to a further development of the invention, it is suggested that in the crank plane an inclined lubricating oil-conveying bore is provided which extends from the bored-through shaft journal through the web to the crankpin center. This bore, which is evenly spaced from the fillets of the shaft journal and the crankpin exits within the diameter of the relief bore. The central position of this lubricating oil-conveying bore within the crankweb is located within the region of low stresses and in an advantageous manner within the bottom surface of the relief bore so that no intersection with the circumference of the relief bore occurs. This position can easily be realized and simultaneously permits to close the lubricating oil-conveying bore by customary stoppers with press fit.

For purposes of further reducing maximum stresses which concentrate in particular on the surface, it is suggested that the edge of intersection of the relief bore with its outer web is broken or rounded by an annular phase.

According to a further feature of the invention, it is suggested that the shaft journals are bored through in the longitudinal direction thereof. In this way, for the highly stressed fillet of a crankpin there is in the lower region in the crank plane obtained an effective reduction of the stress peaks and distribution of the stresses toward both sides into the wide elliptical web.

In this way, a crankshaft is obtained in which due to the favorable shape and mutual adaptation of the individual steps, the maximum stresses can be considerably lower so that the form strength increases correspondingly and an increase in the output of the engine is possible without changing major dimensions.

Referring now to the drawing in detail, the drawing shows a single crank of a crankshaft for an internal combustion engine of the V-type. The two shaft journals 1, 2 are bored through in axial direction. Due to this longitudinal bore 3, in particular stress peaks in the fillet 4 are reduced in the lower range of the crankpin 5, and a distribution of the stresses toward both sides into the elliptical crank webs 6, 7 is realized.

The crankwebs 6, 7 are slanted above the crankpin center so that their thickness decreases uniformly up to the upper end of the crankpin 5. This arch slanting 8 corresponds to a cone shape, the axis of which is located in the center of the shaft journal. As a result thereof, the conical shape can be manufactured by turning the crankshaft about its axis. A slanting which in contrast to the drawing is limited by a straight surface is likewise possible. Within the region of the slanting 8, a relief bore 9 is provided in the web 6 and 7 of the crankpin 5. The flat bottom surface of the relief bore 9 merges by a relatively large fillet with the circumferential surface. The depth of the relief bore 9 extends in the axis-near region of the crankshaft approximately up to the center of the thickness of the crankwebs. The distance of the crankwebs from the center of the shaft journal 1, 2 up to the edge of the relief bore 9 in the axis-near region of the crankshaft amounts to 0.6 times the diameter of the shaft journal. Moreover, the relief bore 9 has in the axis-remote region between its circumferential surface and the fillet 4 of the crankpin 5 a minimum thickness of 12 mm. Between these marginal confinements, the diameter of the relief bore 9 may amount to from 0.35 to 0.55 times the diameter of the shaft journal 1, 2.

Due to this position and size of the relief bore 9, the maximum stresses in the fillet 10 of the shaft journal 1, 2 are considerably reduced within the region of the crank plane and are distributed toward the side of the wide elliptical webs 6, 7. The reduction in the maximum stresses represents a number-wise low ratio of maximum stresses to rated stresses which ratio is expressed by the so-called form quotient. Low form quotients represent a low load of the structural element and thereby a greater strength of the structural element or of the shape. The described favorable shape of the crank throw is supplemented by the confinement of the hardening zones 11, 12 which extends over the entire length of the crankpin 5 including the fillets 4 up to the webs 6, 7, whereas with the shaft journals 1, 2 it remains limited only to the cylindrical portion thereof. In this way, the form resistance of the crankpin and the adjacent web portion in whose region according to experience the most stressed area is located, is considerably increased so that the form resistance of the stronger shaft journal is compensated for. In addition thereto, the limitation of the hardened zone with the shaft journal has the advantage that the crankshaft can permanently be aligned which is necessary with hardened shafts in order to avoid distortion. Totally hardened crankshaft or such in which the crankpin and the shaft journal including the hollow fillet are hardened up to the surface of the webs cannot be aligned. The seemingly aligned crankshaft will when being subjected to loads spring back to its original shape. Moreover, when carrying out the aligning step in connection with a hardened crankshaft, slight tears occur from which actual breakage may start.

From the shaft journals 1, 2 a lubricating oil-conveying passage 13 leads through the web 6 to the crankpin 5. In order that the crankweb 6 is weakened a minimum, the lubricating oil-conveying passage 13 is so inclined that it is approximately evenly spaced with regard to the adjacent fillets 4, 10 of the crankpin 5 as well as of the shaft journal 1, 2. At the same time, the lubricating oil-conveying passage is selected as to location and size so that it is located within the relief bore 9. The lubricating oil-conveying passage thus is also located outside the region of dangerously high surface stresses and can be produced in a simple manner while not requiring careful rounding in the exit into the relief bore 9. This is different with the relief bores 9 which are located directly within the region of maximum surface stresses and for this reason are provided with an annular bevel 14. The bevel 14 can be manufactured in a simple manner as a careful rounding of the edge of the relief bore.

It is, of course, to be understood that the present invention is, by no means, limited to the specific showing in the drawing, but also comprises any modifications within the scope of the appended claims.

What we claim is:

1. A crank shaft in combination for a multicylinder short stroke internal combustion engine having crank pins and shaft journals with one diameter of adjacent crank pins and shaft journals overlapping each other and also having crank webs each of which connects one crank pin with a portion of one respective adjacent shaft journal, each of said crank webs decreasing in thickness from approximately the middle of the crank pin with increasing distance from the shaft center, each of said crank webs within the region of the respective adjacent crank pin portion being provided with a blind bore forming a relief bore having its axis inclined with regard to the axis of the respective adjacent shaft journal so as to confine therewith an acute angle, each of said relief bores having a flat bottom surface and a circumferential surface merging with said flat bottom surface along a transitional rounded surface section with that merging surface which is closest to the area of the respective nearest shaft journal being located approximately in a plane perpendicular to the longitudinal axis of said crank shaft and approximately in the middle of each crank web between the respective adjacent crank pin and said last mentioned shaft journal, while with a diameter ratio of crank pin to shaft journal amounting to 0.8 the diameter of said relief bores corresponds to from 0.35 to 0.55 times the diameter of the respective adjacent shaft journals but with its maximum being limited to such a value that the overlapping of the respective relief bore with the outer contour of the respective adjacent web is spaced from the shaft axis by a minimum distance of 0.6 times the diameter of the shaft journal while each relief bore has a minimum distance of 12 mm from the respective section over which the crank pin merges with the respective adjacent crank web.

2. A crank shaft in combination according to claim 1, in which said shaft journal has an outer circumferential cylindrical hardened zone, and in which the crank pin has an outer cylindrical hardened zone and rounded zones which are likewise hardened and along which said last mentioned cylindrical zone merges with said crank webs.

3. A crank shaft in combination according to claim 1, in which each of said shaft journals has an axial bore therethrough and also has for each crank pin an inclined lubricant conveying passage starting at and extending from the axial bore through one shaft journal through the adjacent crank web and adjacent crank pin to that relief bore pertaining to said last mentioned crank pin which is remote from said axial bore at which said lubricant conveying passage starts, conduit means communicating with said lubricant conveying passage leading to the outer periphery of said last mentioned crank pin, said lubricant conveying passage being substantially equally spaced on one hand from that merging section along which that outer peripheral zone of the shaft journal which is adjacent said start of said lubricant conveying passage merges with the respective adjacent crank web and on the other end from that merging zone over which the respective shaft journal merges with the inner periphery of said last mentioned crank pin.

4. A crank shaft in combination according to claim 1, in which each web has its outer lateral portion inclined toward that central plane of the respective adjacent crank pin which extends perpendicularly with regard to the axis of said crank shaft, and in which the intersecting edge formed by the intersection of the respective relief bore with the respective pertaining inclined web portion is chamfered.

* * * * *